United States Patent
Chun et al.

(10) Patent No.: US 6,236,680 B1
(45) Date of Patent: *May 22, 2001

(54) ENCODING AND DECODING SYSTEM OF MOTION IMAGE CONTAINING ARBITRARY OBJECT

(75) Inventors: Kang-Wook Chun, Seoul; Byeung-Woo Jeon, Sungnam, both of (KR)

(73) Assignee: Samsung Electronics Electronics Co., Ltd., Kyungki-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 09/504,934

(22) Filed: Feb. 16, 2000

Related U.S. Application Data

(63) Continuation of application No. 08/864,992, filed on May 29, 1997, now Pat. No. 6,038,258.

(30) Foreign Application Priority Data

May 29, 1996 (KR) .................................................. 96-18612

(51) Int. Cl.[7] .............................. H04N 7/12; H04N 7/32; H04B 1/66
(52) U.S. Cl. ....................................................... 375/240.01
(58) Field of Search .............................. 375/240, 240.01, 375/240.16; 348/413.1, 415.1, 416.1, 417.1, 699, 700, 845.1, 418; 382/232, 234, 238, 240, 243, 244; H04N 7/12, 7/32; H04B 1/66

(56) References Cited

U.S. PATENT DOCUMENTS

| | | | |
|---|---|---|---|
| 5,274,453 | 12/1993 | Maeda | 358/183 |
| 5,598,215 | 1/1997 | Watanabe | 348/416 |
| 5,635,929 | 6/1997 | Rabowsky | 341/50 |
| 5,654,771 | 8/1997 | Tekalp et al. | 348/699 |
| 5,689,306 | 11/1997 | Jung | 348/416 |
| 5,719,629 | 2/1998 | Chun et al. | 348/413 |

(List continued on next page.)

FOREIGN PATENT DOCUMENTS 7-170523  7/1995  (JP) .

OTHER PUBLICATIONS

Image Communication, vol. 2, No. 4, dated Dec. 1990, pp. 409–428.

\* cited by examiner

*Primary Examiner*—Chris Kelley
*Assistant Examiner*—Tung Vo
(74) *Attorney, Agent, or Firm*—Sughrue, Mion, Zinn, Macpeak & Seas, PLLC

(57) ABSTRACT

A motion image encoding apparatus for a current image containing an object uses mesh representation for encoding a motion image. The encoding apparatus includes an object extractor for extracting the object contained in the current image from received current image data and outputting object contour data indicating a contour of the extracted object. A predictive encoder performs a predictive encoding operation using the current image data, prestored data of a reference image, and control points of meshes which divide one of the current image and the reference image, and generates motion information relating to the control points, differential data between the current image and the reference image, and predictive image data. An object difference generator selects differential data in an object region among the differential data supplied from the predictive encoder to encode the selected differential data based on the object contour data output from the object extractor, and generates the selected differential data and the encoded differential data. An adder receives and adds the predictive image data output from the predictive encoder and the differential data selected in the object difference generator, and updates the reference image data prestored in the predictive encoder using the image data obtained by the addition result.

2 Claims, 4 Drawing Sheets

U.S. PATENT DOCUMENTS

| | | | |
|---|---|---|---|
| 5,736,987 | 4/1998 | Drucker et al. | 345/420 |
| 5,751,365 | 5/1998 | Yokoyama | 348/416 |
| 5,815,601 * | 9/1998 | Kataka et al. | 382/232 |
| 5,815,685 * | 9/1998 | Kmon | 395/500 |
| 5,818,463 | 10/1998 | Tao et al. | 345/473 |
| 5,819,070 * | 10/1999 | Sasaki | 395/500 |
| 5,907,626 | 5/1999 | Toklu et al. | 382/107 |
| 5,930,494 * | 7/1999 | Akiyama | 395/500 |
| 5,936,671 | 8/1999 | Van Beck et al. | 348/413 |
| 5,978,515 * | 10/1999 | Kataka et al. | 382/243 |
| 6,038,258 * | 3/2000 | Chun et al. | 375/240 |
| 6,047,088 * | 4/2000 | Van Beek et al. | 382/243 |
| 6,058,212 * | 5/2000 | Yohoyama | 382/236 |

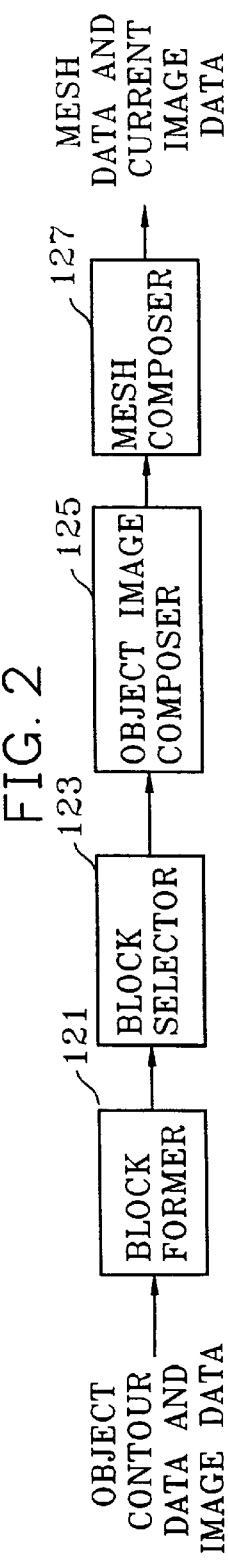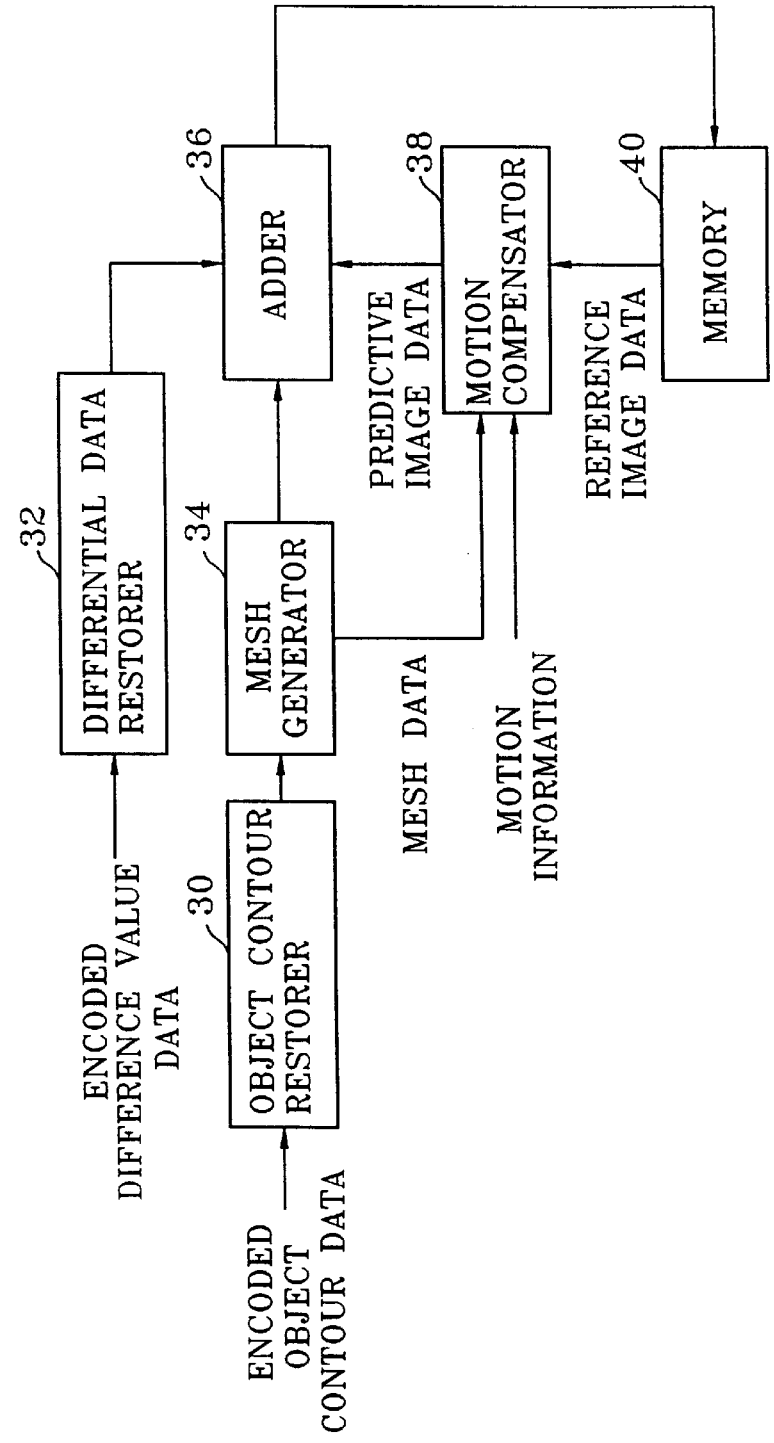

ENCODING AND DECODING SYSTEM OF MOTION IMAGE CONTAINING ARBITRARY OBJECT

This application is a continuation of Ser. No. 08/864,992 filed May 29, 1997, U.S. Pat. No. 6,038,258.

BACKGROUND OF THE INVENTION

The present invention relates to an encoding and decoding system of a motion image containing an arbitrary object.

Recently, international standards for transmitting a motion image at a very low bit rate have been progressively advancing in order to be applied to a video phone or a video conference system. To transmit a motion image at a very low rate, an object-oriented encoding technique for partitioning a meaningful object in the motion image and transmitting the partitioned object is being widely studied. The object-oriented encoding technique is recognized as an essential technique in order to transmit a motion image at a very low bit rate. In the object-oriented encoding of a motion image, a motion prediction technique for removing temporal correlation with respect to an object is required and a more accurate motion prediction technique is also needed for enhancing encoding efficiency.

SUMMARY OF THE INVENTION

It is an object of the present invention to provide an encoding apparatus for a motion image containing an arbitrary object in which the arbitrary object extracted from an image is represented as meshes, and control points of the meshes are used for motion predictive encoding of the image.

Another object of the present invention is to provide a decoding apparatus for decoding data encoded in the above encoding apparatus.

To accomplish the above object of the present invention, there is provided a motion image encoding apparatus for encoding a current image containing an object, the motion image encoding apparatus comprising: an object extraction unit for extracting the object contained in the current image from received current image data and outputting object contour data indicating a contour of the extracted object; a predictive encoding unit for performing a predictive encoding operation using the current image data, prestored data of a reference image, and control points of meshes which divide one of the current image and the reference image, and generating motion information involved with the control points, differential data between the current image and the reference image, and predictive image data; an object difference generator for selecting differential data in an object region among the differential data supplied from the predictive encoding unit to encode the selected differential data based on the object contour data output from the object extraction unit, and generating the selected differential data and the encoded differential data; and an addition unit for receiving and adding the predictive image data output from the predictive encoding unit and the differential data selected in the object difference generator, and updating the reference image data prestored in the predictive encoding unit using the image data obtained by the addition result.

To accomplish the other object of the present invention, there is also provided a motion image decoding apparatus for decoding the output of a motion image encoding apparatus, the motion image decoding apparatus comprising: an object contour restoring unit for decoding received encoded object contour data and restoring object contour data indicating a contour of an object contained in a current image; a differential data decoding unit for decoding the received encoded differential data and outputting differential data; a motion compensation decoding unit for performing a motion compensation operation using the object contour data, prestored reference image data, control points of meshes which divide one of an object contour and a reference image, and motion information involved with the control points; and an addition unit for adding the predictive image data selected by the object contour data and the differential data, and updating the reference image data prestored in the motion compensation decoding unit using the image data obtained by the addition result.

BRIEF DESCRIPTION OF THE DRAWINGS

The preferred embodiments are described with reference to the drawings wherein:

FIG. 2 is a detailed block diagram of the mesh producer of FIG. 1;

FIG. 3 is a block diagram showing a motion image decoding apparatus for decoding data encoded by the FIG. 1 apparatus;

DETAILED DESCRIPTION OF THE PREFERRED EMBODIMENTS

Preferred embodiments of the present invention will be described in detail with reference to the accompanying drawings.

Figure 1:
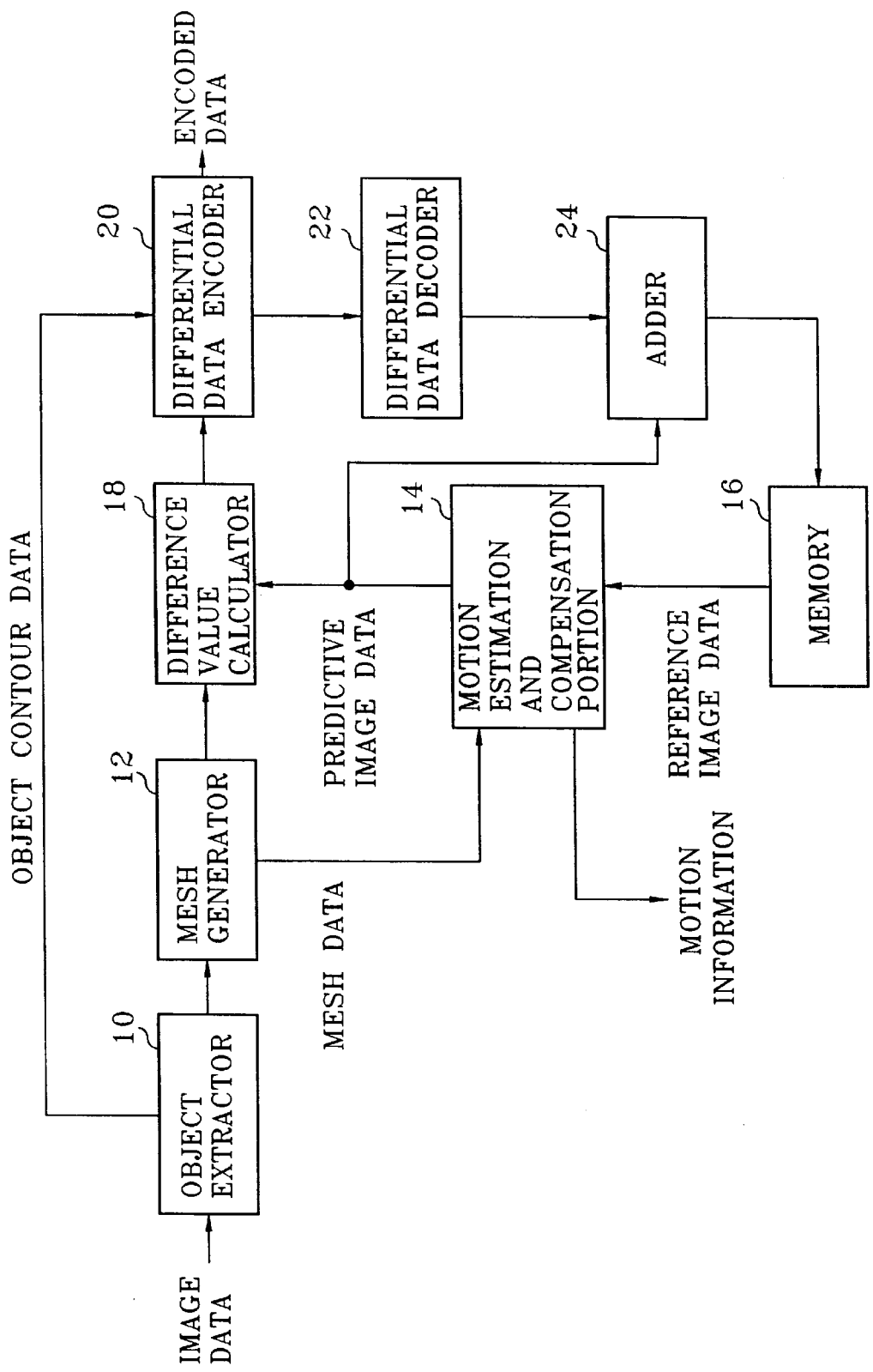
FIG. 1 is a block diagram showing a motion image encoding apparatus according to a preferred embodiment of the present invention.

In FIG. 1 showing a motion image encoding apparatus according to a preferred embodiment of the present invention, an object extractor 10 receives digital image data from an external source, and extracts an arbitrary object from a current image represented by the received image data. Then, the object extractor 10 generates object contour data representing contour information of the extracted object. The object contour data is supplied to a differential data encoder 20 and a decoding apparatus of FIG. 3 to be described later. The object contour data contains spatial positions of pixels which determine a contour of the object or spatial positions of segments composed of the pixels. The object extractor 10 outputs the object contour data and the received current image data to a mesh generator 12. The mesh generator 12 discriminates an object region from the current image based on the object contour data, and performs a signal processing for regular mesh representation with respect to the image in the object region. The detailed structure and operation of the mesh generator 12 will be described with reference to FIG. 2.

A block former 121 in the mesh generator 12 receives the current image data and the object contour data output from the object extractor 10. The block former 121 divides the current image represented by the received image data into image blocks each having a predetermined size, and supplies image block data representing image blocks and the object contour data to a block selector 123. The block selector 123 selects image blocks containing the image data in the object region among the entire image blocks constituting the current image based on the object contour data. The data representing the selected image blocks and the object contour data is output to an object image composer 125. Here, image blocks having only image data which do not belong to the object region, are not selected. Therefore, the data representing the image blocks which are not selected is not supplied to the object image composer 125. The object image composer 125 which receives the data of the selected image blocks merges the selected image blocks and supplies the data representing the object image generated from the merging result and the object contour data to a mesh composer 127. The mesh composer 127 receiving the object image data divides the object image into a regular rectangular mesh or a regular triangular mesh.

In the case that an image is divided using regular rectangular meshes, the mesh composer 127 divides the object image into grids each having a predetermined size different from a block size. Here, a grid has a size smaller than a block. Then, the mesh composer 127 determines vertices contained in the object region among the vertices of the grids obtained by the division as control points, and determines grids having the control points as regular rectangular meshes. The mesh composer 127 outputs rectangular mesh data containing the image data involving the control points of the regular rectangular meshes to a motion estimation and compensation portion 14 of FIG. 1. Here, the image data involving each control point includes the position of a control point and a gray value at the position of the control point, and the positions of the pixels having positions adjacent to the control point and the gray values. The mesh composer 127 also outputs the current image data to a difference value calculator 18.

In the case that an image is divided using regular triangular meshes, the mesh composer 127 divides each regular rectangular mesh obtained through the above process into two regular triangular meshes based on similarity of the image data in the mesh. To judge similarity of the image data of each regular rectangular mesh, the mesh composer 127 compares a difference value between pixel values corresponding to two control points which are located at a diagonal direction of 45° in the regular rectangular mesh, with a difference value between pixel values corresponding to two control points located at a diagonal direction of −45° therein in size. The mesh composer 127 divides the rectangular mesh in the diagonal direction corresponding to the smaller difference value. As a result, two regular triangular meshes are generated for each rectangular mesh. The mesh composer 127 outputs the triangular mesh data containing the image data involving the control points of the regular triangular meshes to the motion estimation and compensation portion 14. The mesh composer 127 outputs the current image data to a difference value calculator 18 as well.

The motion estimation and compensation portion 14 performs motion estimation and compensation using the reference image data stored in the memory 16 and the mesh data involving the object image in the current image received from the mesh former 12. The motion estimation and compensation portion 14 first compares in magnitude the image data involved in the control points of each mesh with the reference image data stored in the memory 16. Each control point ideally corresponds to a single pixel. That is, a control point is expressed by a spatial position of a pixel and a gray value. However, it is actually difficult to exactly find out a position having image data similar to the control point in the reference image by only pixel to pixel comparison. Thus, the image data involving each control point is image data which is involved in a pixel corresponding to the control point and a plurality of pixels neighboring the pixel corresponding to the control point, as described in the mesh composer 127. The motion estimation and compensation portion 14 determines a position in the reference image having the image data which is most similar to the image data of the control point based on the data magnitude comparison result. Then, the motion estimation and compensation portion 14 determines a motion vector representing movement between a control point and a corresponding position in the reference image. If the motion vectors are determined with respect to all the control points, the motion estimation and compensation portion 14 performs spatial transformation such as image warping using the determined motion vectors, and generates a predictive image with respect to the current image. The data representing the predictive image is output to the difference value calculator 18 and the adder 24. The motion information representing the motion vectors corresponding to all the control points is supplied to the FIG. 3 apparatus. Since the above-described spatial transformation is well known in the field of a digital image processing, the detailed description thereof will be omitted.

The difference value calculator 18 calculates difference values between the current image data received from the mesh generator 12 and the predictive image data output from the motion estimation and compensation portion 14. The difference value calculation is performed between the pixels having corresponding positions with respect to the current image and the predictive image, and the resultant difference value data is output to a differential data encoder 20. The differential data encoder 20 encodes difference value data in the object region determined by the object contour data of the object extractor 10 among the difference value data supplied from the difference value calculator 18. If the data encoded by the differential data encoder 20 is defined as difference value data in the object region, only difference value data involving the object of the current image is encoded. Accordingly, the differential data encoder 20 can perform a more efficient encoding operation with respect to the current image. The differential data encoder 20 encodes the object contour data received from the object extractor 10 as well. To encode the difference value data and the object contour data in the object region, the differential data encoder 20 uses a well-known orthogonal transform coding method including discrete cosine transform (DCT) and so on. The encoded object contour data, the encoded difference value data and the motion information are transmitted to a decoding apparatus of FIG. 3 to be described later via a transmission channel (not shown), or are recorded on a storage medium used in the decoding apparatus of FIG. 3.

A differential data decoder 22 receiving the encoded difference value data from the differential data encoder 20 restores the difference value data via a reverse procedure of the signal processing of the differential data encoder 20. The adder 24 adds the predictive image data output from the motion estimation and compensation portion 14 and the difference value data of the differential data decoder 22, and outputs the added result to the memory 16. The data output from the adder 24 is data of the current image from which motion estimation and compensation has been performed, and is stored in the memory 16 to be used as reference image data for motion estimation and motion compensation with respect to a next image.

A motion image decoding apparatus shown in FIG. 3 receives the encoded difference value data, the encoded object contour data and the motion information generated by the FIG. 1 apparatus. An object contour restorer 30 decodes the encoded object contour data. The object contour data is output to a mesh generator 34. The mesh generator 34 receiving the object contour data divides the entire image into grids each having a predetermined size, determines vertices existing in the object region determined by the object contour data as control points among the vertices of the grids obtained by the division, and determines the grids having the control points as rectangular meshes. In the case that the mesh generator 12 of FIG. 1 is designed to generate mesh data representing the rectangular meshes, the mesh generator 34 also generates mesh data representing rectangular meshes. Meanwhile, in the case that the mesh generator 12 of FIG. 1 is designed to generate the mesh data involving triangular meshes, the mesh generator 34 generates mesh data involving the triangular meshes. The mesh generator 34 supplies the generated mesh data to a motion compensator 38 and supplies the object contour data to an adder 36.

Meanwhile, a differential data decoder 32 decodes the encoded difference value data generated by the FIG. 1 apparatus. The difference value data is output to the adder 36. The motion compensator 38 receives the mesh data output from the mesh generator 34 and the motion information generated by the FIG. 1 apparatus. The motion compensator 38 generates predictive image data using control points contained in the mesh data corresponding to a current image, motion vectors corresponding to all the control points and contained in motion information, and the reference image data stored in the memory 40. To generate the predictive image data, the motion compensator 38 uses a motion vector corresponding to each control point to find out a position in the reference image which is most similar to the control point, and then uses spatial transformation such as image warping to generate predictive image data for a current image. The motion compensator 38 outputs the generated predictive image data to an adder 36.

The adder 36 receives the predictive image data output from the motion compensator 38 and the difference value data output from the differential data decoder 32. The adder 36 adds only predictive image data in the object region determined by the object contour data supplied from the mesh generator 34 among the entire predictive image data to the difference value data corresponding thereto. By doing so, image data with respect to an object in the current image can be restored. The output data of the adder 36 is stored in the memory 40 to be used as reference image data for motion compensation of a next image.

Figure 4:
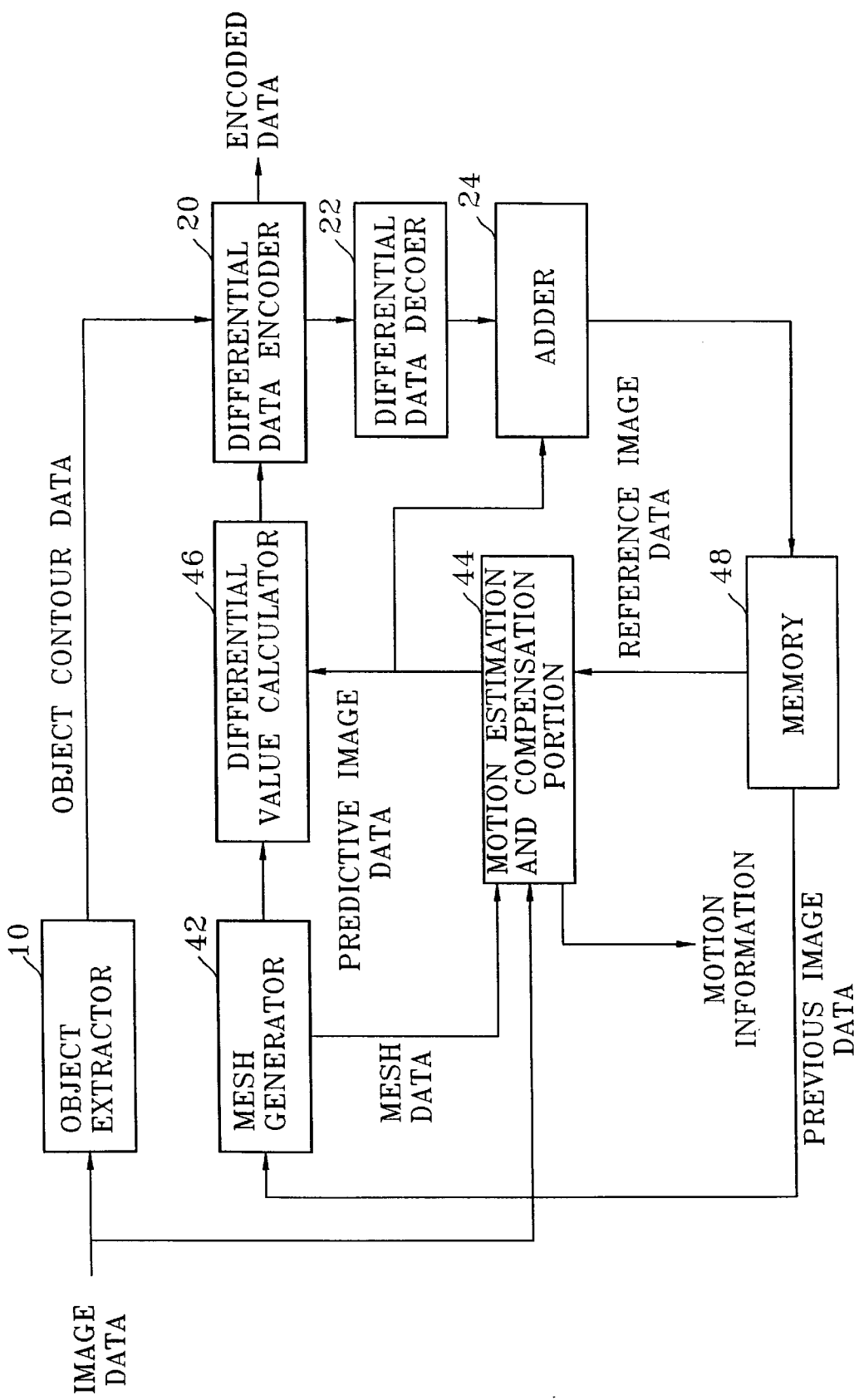
FIG. 4 is a block diagram showing a motion image encoding apparatus according to another preferred embodiment of the present invention.

FIG. 4 is a block diagram showing a motion image encoding apparatus according to another preferred embodiment of the present invention. Since the blocks of FIG. 4 having the same reference numerals as those of the FIG. 1 blocks perform the same functions as those of the corresponding blocks of FIG. 1, the detailed description thereof will be omitted. The FIG. 1 apparatus uses the meshes obtained from the current image and the reference image data stored in the memory 16 to generate predictive image data. On the contrary, the FIG. 4 apparatus uses meshes obtained from reference image data stored in a memory 48 and externally input current image data to generate predictive image data.

The external current image data is input to the object extractor 10 and a motion estimation and compensation portion 44. The object extractor 10 generates object contour data using the current image data. The object contour data is output to the differential data encoder 20. A mesh generator 42 reads the reference image data stored in the memory 48 and divides the entire reference image into irregular meshes. For such division, the mesh generator 42 divides the reference image into regular rectangular meshes and divides the regular rectangular meshes into regular triangular meshes. Since the method for generation of the regular rectangular meshes and the regular triangular meshes is the same as a signal processing of the FIG. 1 mesh generator 12, the detailed description thereof will be omitted.

Another function of the mesh generator 42 generates an irregular mesh from regular rectangular meshes or regular triangular meshes. The procedure of generating the irregular mesh is as follows. The mesh generator 42 removes one selected among the control points of the regular triangular meshes, and performs triangulation with respect to the region from which the control point is removed. The triangular meshes generated by the triangulation have irregular triangular shapes. Such control point removal and triangulation repeats until the number of the remaining control points is identical to a predetermined value. To remove a particular control point, a quantified difference value is obtained between image descriptiveness obtained when the control point has been removed from a support region of the control point and that when the former has not been removed. Here, the support region is a region surrounded by neighboring control points to a corresponding control point and lines connecting the neighboring control points. A control point corresponding to the smallest difference value among the quantified difference values of the image descriptiveness contributes little to the image descriptiveness, and accordingly can be removed. The irregular mesh generation technique is disclosed in a paper entitled "Irregular Triangular Mesh Representation Based on Adaptive Control Point Removal" published in SPIE's 1996 *Symposium on Visual Communications and Image Processing* by Kang W. Chun, Byungwoo Jean and Jae M. Jo. The mesh generator 42 outputs information about the finally generated irregular triangular meshes, that is, the irregular mesh data representing the remaining control points and the irregular meshes surrounded by the control points, to a motion estimation and compensation portion 44. The mesh generator 42 outputs the reference image data read from the memory 48 to a difference value calculator 46 as well.

The motion estimation and compensation portion 44 receives the externally supplied current image data and the irregular mesh data of the mesh generator 42, and reads the reference image data stored in the memory 48. The motion estimation and compensation portion 44 determines corresponding positions in the current image having the image data which is most similar to the control points of the irregular meshes. After the corresponding positions are determined, the motion estimation and compensation portion 44 generates motion vectors between the control points and the corresponding positions and uses spatial transformation to generate a predictive image using the current image. The predictive image data is supplied to the difference value calculator 46 and the adder 24, and the motion information representing the motion vectors are transmitted via a transmission channel or recorded on a storage medium to be used for a decoding apparatus.

The difference value calculator 46 generates difference value data between the reference image data received from the mesh generator 42 and the predictive image data from the motion estimation and compensation portion 44, to supply the difference value data to a differential data encoder 20. The differential data encoder 20 encodes the object contour data output from the object extractor 10 and the difference value data output from the difference value calculator 46. The differential data encoder 20 processes the input data in the same manner as those of the corresponding blocks of FIG. 1. Thus, the encoded data output from the differential data encoder 20 includes data obtained by encoding the difference value data in the object region and the encoded object contour data. The encoded data is transmitted to a receiver via a transmission channel (not shown), or is recorded on a recording medium (not shown). The encoded difference value data among the encoded data is transmitted to the differential data decoder 22.

The differential data decoder 22 decodes the difference value data encoded in the differential data encoder 20, to supply the decoded difference value data to the adder 24. The adder 24 adds the predictive image data supplied from the motion estimation and compensation portion 44 and the difference value data of the differential data decoder 22, and the resultant data is stored in the memory 48, to be used as reference image data for motion estimation and motion compensation for a next image.

Figure 5:
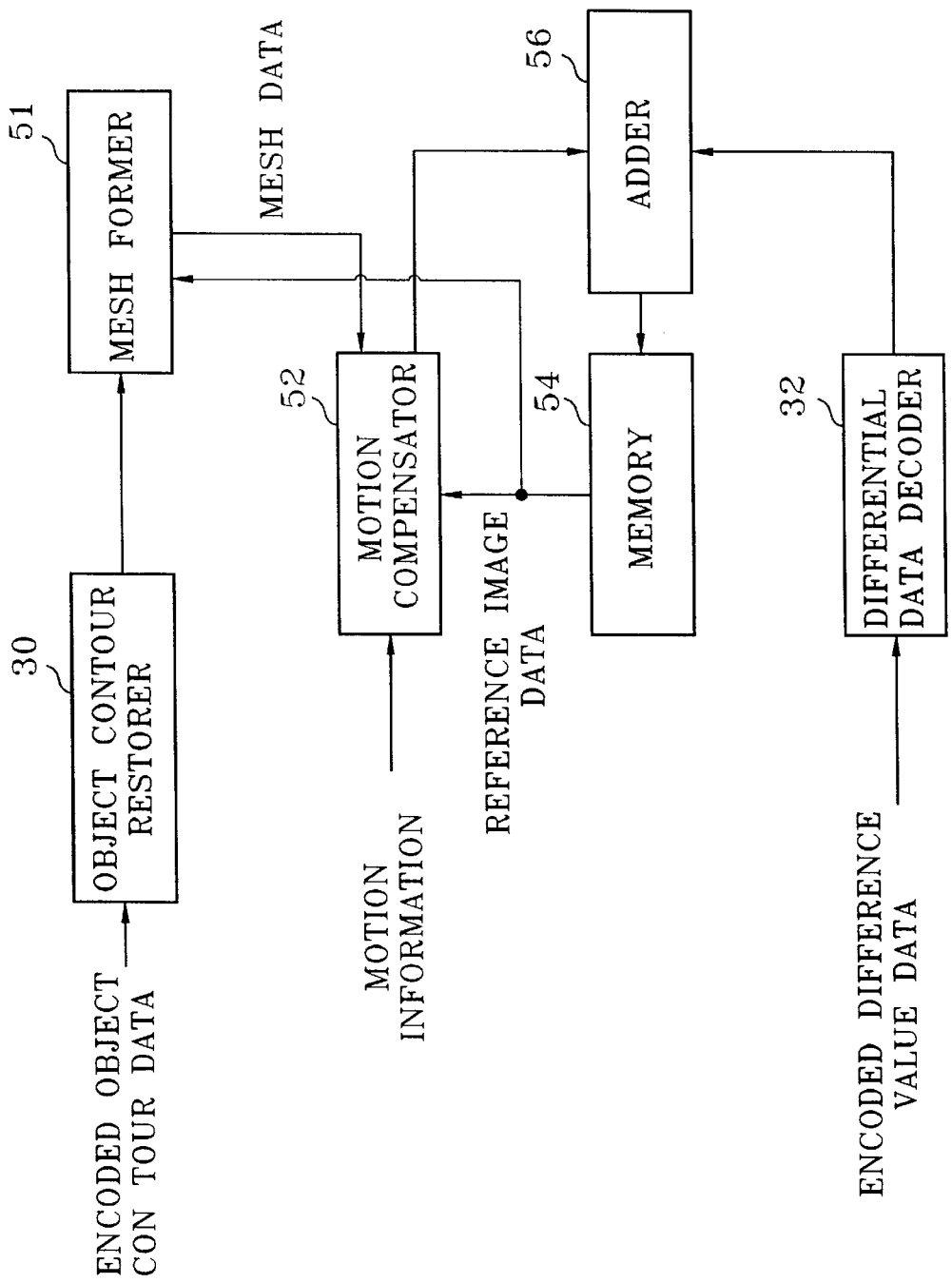
FIG. 5 is a block diagram showing a motion image decoding apparatus for decoding data encoded by the FIG. 4 apparatus.

FIG. 5 shows a motion image decoding apparatus corresponding to the FIG. 4 apparatus. Since blocks having the same reference numerals as those of the FIG. 3 blocks among the blocks shown in FIG. 5 have the same functions as those of the FIG. 3 blocks, the detailed description thereof will be omitted. The encoded object contour data is input to an object contour restorer 30 and the motion information is input to a motion compensator 52. Also, the encoded difference value data is supplied to the differential data decoder 32. The differential data decoder 32 decodes the encoded difference value data to output the decoded difference value data to an adder 56. The object contour restorer 30 decodes the encoded object contour data to output the decoded object contour data to a mesh former 51. The mesh former 51 reads the reference image data stored in a memory 54, and divides the object region in the reference image determined by the object contour data via the same signal processing as that of the FIG. 4 mesh generator 42, into irregular meshes. The mesh data output from the mesh former 51 is supplied to the motion compensator 52. The motion compensator 52 uses the mesh data, the motion information and the reference image data stored in the memory 54 to generate the predictive image data. The adder 56 adds the predictive image data and the difference value data output from the differential data decoder 32. The resultant current image is stored in the memory 54 to be used as reference image data for motion compensation of a next image.

As described above, the encoding and decoding system according to the present invention performs motion estimation and motion compensation based on mesh representation with respect to an arbitrary object contained in an image. As a result, a more efficient encoding can be performed compared with a case when motion estimation and motion compensation is performed with respect to the entire image. Thus, an apparatus appropriate for applications requiring a very low bit rate can be designed.

While only certain embodiments of the invention have been specifically described herein, it will apparent that numerous modifications may be made thereto without departing from the spirit and scope of the invention.

What is claimed is:

1. An object-oriented image encoding apparatus for performing a motion prediction and compensation in a unit of an object image, the object-oriented image encoding apparatus comprising:

object contour information extraction means for extracting information representing a contour of an object image from an image represented by received image data and outputting the extracted contour information:

mesh production means for representing the object image as a triangular or a rectangular mesh;

motion vector producing means to produce a motion vector on a node point of the mesh in the object image represented as the mesh; and transmission means for transmitting said contour information, mesh information and said motion vector on the node point of the mesh.

2. An object-oriented image encoding method for performing a motion prediction and compensation in a unit of an object image, the object-oriented image encoding method comprising the steps of:

(a) extracting information representing a contour of an object image from an image represented by received image data and outputting the extracted contour information:

(b) representing the object image as a triangular or a rectangular mesh;

(c) producing a motion vector on a node point of the mesh; and (d) transmitting said contour information, mesh information and said motion vector on the node point of the mesh.

* * * * *